(12) United States Patent
Cuartero

(10) Patent No.: US 11,900,284 B2
(45) Date of Patent: Feb. 13, 2024

(54) DYNAMIC SCHEDULING SYSTEM WITH PERFORMANCE-BASED ACCESS

(71) Applicant: Intuit Inc., Mountain View, CA (US)

(72) Inventor: Jeffrey Cuartero, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/205,819

(22) Filed: Mar. 18, 2021

(65) Prior Publication Data

US 2022/0300887 A1 Sep. 22, 2022

(51) Int. Cl.
*G06Q 10/00* (2023.01)
*G06Q 10/0631* (2023.01)
*G06Q 10/0639* (2023.01)

(52) U.S. Cl.
CPC ........... *G06Q 10/063112* (2013.01); *G06Q 10/06398* (2013.01)

(58) Field of Classification Search
None
See application file for complete search history.

(56) References Cited

U.S. PATENT DOCUMENTS

| | | | | |
|---|---|---|---|---|
| 2011/0255685 A1* | 10/2011 | Flockhart | ............ | H04M 3/5232 379/266.07 |
| 2014/0142998 A1* | 5/2014 | Kroeger | ........... | G06Q 10/06311 705/7.13 |
| 2014/0229221 A1* | 8/2014 | Shih | ................ | G06Q 10/06312 705/7.23 |
| 2016/0162478 A1* | 6/2016 | Blassin | .......... | G06Q 10/063112 706/12 |
| 2018/0143975 A1* | 5/2018 | Casal | ...................... | G06F 40/51 |
| 2018/0158548 A1* | 6/2018 | Taheri | ................ | G06Q 10/1093 |
| 2018/0173501 A1* | 6/2018 | Srinivasan | ..... | G06Q 10/063112 |

(Continued)

OTHER PUBLICATIONS

Dalapati, Poulami, Dynamic process scheduling and resource allocation in distributed environment: an agent-based modelling and simulation, Jul. 12, 2017, Taylor & Francis Online, https://www.tandfonline.com/doi/full/10.1080/13873954.2018.1512504, p. 1-34. (Year: 2017).*

(Continued)

*Primary Examiner* — Joseph M Waesco
(74) *Attorney, Agent, or Firm* — Paradice & Li LLP

(57) ABSTRACT

This disclosure provides systems, methods and apparatuses for scheduling tasks in an electronic system. In some implementations, a dynamic scheduling system allows performance-based access to a task schedule. In distributing tasks to be completed, the dynamic scheduling system prioritizes resources that are more proficient at completing the tasks over resources that are less proficient. For example, resources that are more proficient may receive higher-priority access to the task schedule than resources that are less proficient. Each resource may be assigned a proficiency score based on quantitative or qualitative performance indicators associated with tasks previously completed by the resource. Each resource is dynamically provided access to the task schedule based on its proficiency score. For example, resources having the highest performance scores may be first to receive access to a set of timeslots, whereas resources having the lowest performance scores may be last to receive access to the set of timeslots.

20 Claims, 9 Drawing Sheets

(56) References Cited

U.S. PATENT DOCUMENTS

| | | | |
|---|---|---|---|
| 2018/0260253 A1* | 9/2018 | Nanda | G06F 11/3476 |
| 2019/0303197 A1* | 10/2019 | Li | G06F 9/4887 |
| 2020/0210918 A1* | 7/2020 | Brand | G06N 5/04 |
| 2020/0210962 A1* | 7/2020 | Monovich | G06Q 10/1095 |
| 2020/0210964 A1* | 7/2020 | Monovich | G06Q 10/063118 |
| 2020/0272978 A1* | 8/2020 | Flores | G06Q 10/063114 |
| 2022/0343257 A1* | 10/2022 | Mohanty | G06F 40/30 |

OTHER PUBLICATIONS

International Search Report and Written Opinion, dated Apr. 26, 2022, issued in PCT Application No. PCT/US2022/018271, 13-pages.

* cited by examiner

400

| Resource ID 410 | Proficiency Score 420 |
|---|---|
| 1 | 90 |
| 2 | 80 |
| 3 | 70 |
| 4 | 60 |
| 5 | 40 |
| 6 | 30 |
| 7 | 20 |
| ⋮ | ⋮ |
| M | 10 |

FIG. 4

| | Week 1 | Week 2 | Week 3 | Week 4 | Week 5 |
|---|---|---|---|---|---|
| Class A: | Timeslots 702-705 | Timeslots 703-706 | Timeslots 704-707 | Timeslots 705-708 | Timeslots 706-709 |
| Class B: | Timeslots 702-704 | Timeslots 703-705 | Timeslots 704-706 | Timeslots 705-707 | Timeslots 706-708 |
| Class C: | Timeslots 702-704 | Timeslots 703-704 | Timeslots 704-705 | Timeslots 705-706 | Timeslots 706-707 |
| Class D: | Timeslots 702-704 | Timeslots 703-704 | Timeslots 704 | Timeslots 705 | Timeslots 706 |

DYNAMIC SCHEDULING SYSTEM WITH
PERFORMANCE-BASED ACCESS

TECHNICAL FIELD

This disclosure relates generally to scheduling systems, and specifically to dynamic scheduling systems with performance-based access.

DESCRIPTION OF RELATED ART

Scheduling systems are often used to connect users with content, products, or services (such as e-commerce, crowd-sourcing, and various other online service providers). For example, a tax preparation service may receive requests from users to prepare and file taxes on their behalf (also referred to as "tasks"). The tax preparation service may connect each user with one or more tax preparers (also referred to as "resources") associated with the service to perform the requested tasks. For example, the tax preparation service may include a scheduling system that allocates blocks of time to the tax preparers for completing the tasks. A given tax preparer may perform work on one or more users' taxes during the blocks of time allocated by the scheduling system to that tax preparer. Accordingly, a scheduling system may distribute tasks among its resources to satisfy the demands of its users.

Some scheduling systems may provide resources a certain degree of autonomy in setting their schedules. For example, a scheduling system may generate a shared schedule (such as a calendar) that is accessible or viewable by all resources associated with the scheduling system. The schedule may display or otherwise indicate a number of open or available timeslots that each resource can reserve or "sign up" for. A timeslot may be removed from the schedule or indicated to be "closed" (or otherwise unavailable) when a threshold number of resources have signed up for that timeslot. For example, if no more than five tax preparers are needed at any given time, the scheduling system may not allow a sixth tax preparer to sign up for a timeslot that has already been reserved five times. As a result, the number of available timeslots diminishes over time.

Existing scheduling systems provide each resource an equal opportunity to sign up for a given timeslot. In other words, all resources associated with the scheduling system can view all available timeslots at any given time. However, some resources may be more proficient (or efficient) at completing tasks than others. For example, a given tax preparer may be able to complete multiple tax filings in the amount of time required by another tax preparer to complete a single tax filing. However, a less efficient tax preparer that accesses the schedule early may reserve one or more timeslots that could have otherwise been allocated to a more efficient tax preparer that accesses the schedule later. As such, allowing each resource equal access to the available timeslots may result in a suboptimal distribution of tasks.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method of scheduling tasks in an electronic system. In some implementations, the method may include steps of determining a number of tasks to be completed; generating a schedule that includes one or more first timeslots accessible by a first set of resources, where each of the one or more first timeslots represents a respective period of time allocated for the resources in the first set to complete a first subset of the tasks; determine an amount of time required by each of a plurality of resources associated with the electronic system to complete a respective one of the tasks; assign a proficiency score to each of the plurality of resources based at least in part on the amount of time required by the resource to complete the respective task; and iteratively add each of the plurality of resources to the first set of resources based at least in part on the proficiency score assigned to each resource.

Another innovative aspect of the subject matter described in this disclosure can be implemented in a scheduling system. The scheduling may include one or more processors and a memory storing instructions for execution by the one or more processors. In some implementations, execution of the instructions causes the scheduling system to perform operations including determining a number of tasks to be completed; generating a schedule that includes one or more first timeslots accessible by a first set of resources, where each of the one or more first timeslots represents a respective period of time allocated for the resources in the first set to complete a first subset of the tasks; determine an amount of time required by each of a plurality of resources associated with the electronic system to complete a respective one of the tasks; assign a proficiency score to each of the plurality of resources based at least in part on the amount of time required by the resource to complete the respective task; and iteratively add each of the plurality of resources to the first set of resources based at least in part on the proficiency score assigned to each resource.

Another innovative aspect of the subject matter described in this disclosure can be implemented as a method of scheduling tasks in an electronic system. In some implementations, the method may include steps of determining a number of tasks to be completed; generating a schedule that includes one or more first timeslots accessible by a first set of resources and one or more second timeslots accessible by a second set of resources, where each of the one or more first timeslots represents a respective period of time allocated for the resources in the first set to complete a first subset of the tasks and each of the one or more second timeslots represents a respective period of time allocated for the resources in the second set to complete a second subset of the tasks; adding, to the first set of resources, each of a plurality of resources associated with the electronic system; determining an amount of time required by each of the plurality of resources to complete a respective one of the tasks in the first subset; assigning a proficiency score to each of the plurality of resources based at least in part on the amount of time required by the resource to complete the respective task; and iteratively adding each of the plurality of resources to the second set of resources based at least in part on the proficiency score assigned to each resource.

BRIEF DESCRIPTION OF THE DRAWINGS

The example implementations are illustrated by way of example and are not intended to be limited by the figures of the accompanying drawings. Like numbers reference like elements throughout the drawings and specification.

FIG. 1 shows an example scheduling system, according to some implementations.

FIG. 4 shows a table depicting an example scoring of resources according to some implementations.

FIG. 7B shows an example timetable by which resources may dynamically access the task schedule of FIG. 7A, according to some implementations.

DETAILED DESCRIPTION

Figure 1:
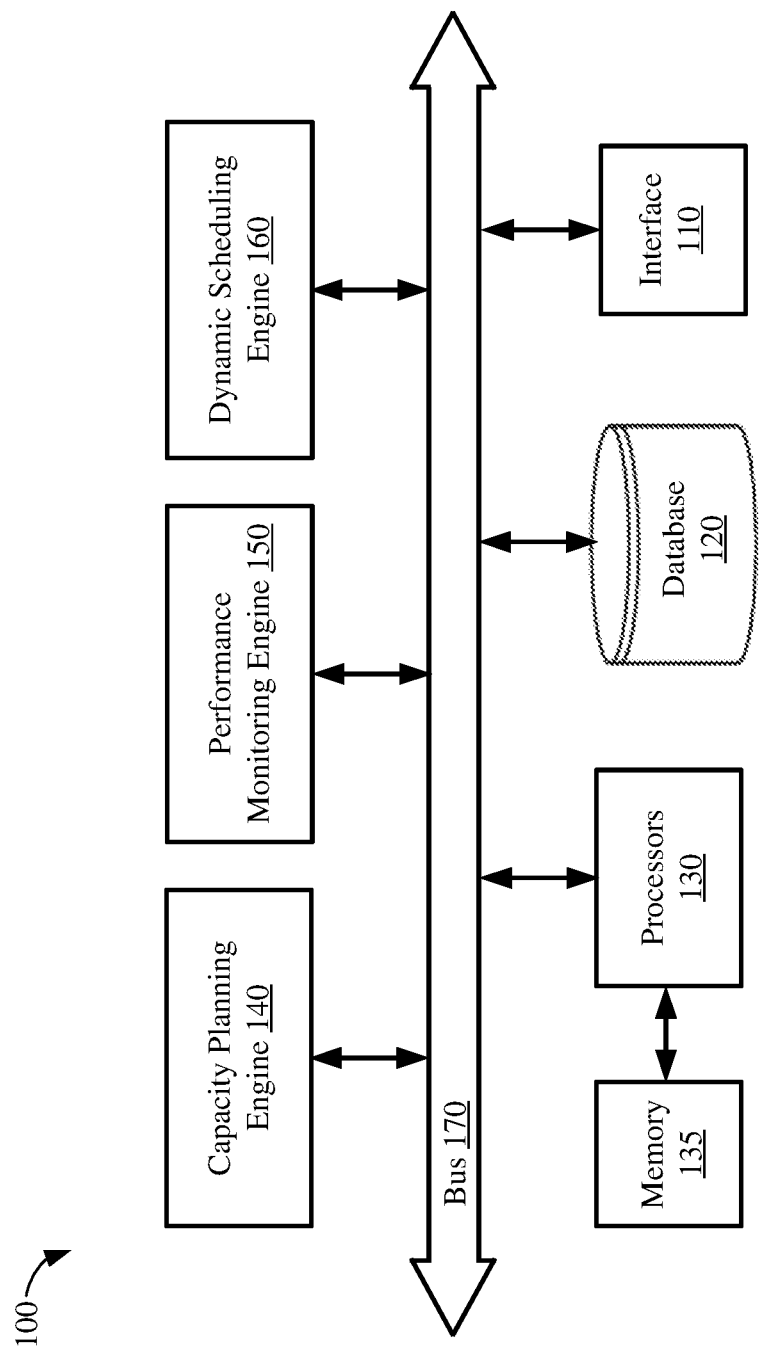

Implementations of the subject matter described in this disclosure may be used to schedule or distribute tasks in an electronic system. As used herein, the term "task" may refer to any goods or services that can be requested by users (or customers) of an electronic system or service. Some tasks may require work to be performed or completed by one or more resources associated with the electronic system or service. For example, a tax preparation service may receive requests from users to prepare and file taxes (the "tasks") on their behalf. The tax preparation service may allocate one or more tax preparers (the "resources") associated with the service to perform work on the requested tasks. Thus, the term "resource" may refer to any person or machine (implemented in hardware, software, or any combination thereof) capable of completing one or more user-requested tasks.

As described above, a scheduling system may distribute tasks among its resources to satisfy the demands of its users. More specifically, the scheduling system may generate a task schedule including a number of open or available timeslots that each resource can reserve or sign up for. Existing scheduling systems provide each resource an equal opportunity to sign up for a given timeslot. However, because some resources may be more proficient (or efficient) at completing tasks than others, allowing each resource equal access to the available timeslots may result in a suboptimal distribution of tasks. Aspects of the present disclosure provide a dynamic scheduling system that allows performance-based access to a task schedule. More specifically, in distributing tasks to be completed, the dynamic scheduling system prioritizes resources that are more proficient at completing the tasks over resources that are less proficient. For example, the resources that are more proficient may be provided higher-priority access to the task schedule than the resources that are less proficient.

In some implementations, each resource is assigned a proficiency score based on quantitative or qualitative performance indicators associated with tasks previously completed by the resource. Example performance indicators may include, but are not limited to, an amount of time required to complete each task, a quality of each completed task, and feedback received for each completed task. Each resource is dynamically provided access to the task schedule based on its proficiency score. For example, resources scoring in the first quartile of performance scores may be allowed to access a set of timeslots earlier than resources scoring in the second quartile, resources scoring in the second quartile may be allowed to access the timeslots earlier than resources scoring the third quartile, and resources scoring in the third quartile may be allowed to access the timeslots earlier than resources scoring in the fourth quartile. In some aspects, the performance indicators may be monitored and updated in real-time (or near real-time) so that resources with the highest proficiency scores at any given time have access to the widest range of available timeslots. This provides underperforming resources an opportunity to receive access to more timeslots by improving their proficiency scores.

Various implementations of the subject matter disclosed herein provide one or more technical solutions to the technical problem of scheduling tasks to be completed by one or more resources associated with an electronic system or service. More specifically, various aspects of the present disclosure provide a unique computing solution to a unique computing problem that did not exist prior to electronic systems and services (such as e-commerce, crowdsourcing, and various other online service providers) that provide content, products, or services to its users, much less, distribute user-requested tasks among associated resources. By dynamically allowing resources to access a task schedule based on the proficiency of each resource at completing the associated tasks, the subject matter disclosed herein provide meaningful improvements to the performance of scheduling systems, and more specifically to ensuring an optimal distribution of tasks while preserving the autonomy of the resources. As such, implementations of the subject matter disclosed herein are not an abstract idea such as organizing human activity or a mental process that can be performed in the human mind.

Moreover, various aspects of the present disclosure effect an improvement in the technical field of scheduling systems. Real-time monitoring of various performance indicators for each of the resources associated with an electronic system (such as an amount of time required to complete each task, a quality of each completed task, and feedback received for each completed task), much less dynamically providing access to a task schedule based on the performance indicators associated with each resource, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

FIG. 1 shows an example scheduling system 100, according to some implementations. Although described herein with respect to distributing tasks among resources associated with an electronic system based on a proficiency of each resource at completing such tasks, various aspects of the scheduling system 100 disclosed herein may be generally applicable for iteratively providing access to a dynamically changing schedule. Specifically, by providing earlier access for resources that meet a given threshold criteria and delayed access for resources that fall short of the threshold, aspects of the present disclosure may optimize the scheduling of resources around any resource-specific parameters. For example, higher-priority resources may have access to more timeslots associated with the schedule than lower-priority resources (which may only access any remaining timeslots that have not yet been reserved).

The scheduling system 100 is shown to include an input/output (I/O) interface 110, a database 120, one or more data processors 130, a memory 135 coupled to the data processors 130, a capacity planning engine 140, a performance monitoring engine 150, and a dynamic scheduling engine 160. In some implementations, the various components of the recommendation system 100 may be interconnected by at least a data bus 170, as depicted in the example of FIG. 1. In some other implementations, the various components of the recommendation system 100 may be interconnected using other suitable signal routing resources.

The interface 110 may include a screen, an input device, and other suitable elements that allow a user, resource, or other electronic system (not shown for simplicity) to provide information to the scheduling system 100 or to retrieve information from the scheduling system 100. Example information that can be provided by a user to the scheduling system 100 may include requests for tasks to be completed by the electronic system or feedback regarding one or more completed tasks (such as a user satisfaction level associated with the completed tasks). Example information that can be retrieved from the scheduling system 100 may include a task schedule (indicating one or more timeslots allocated for completing the requested tasks) or an indication of the availability of each timeslot in the task schedule. Example information that can be provided by a resource to the scheduling system 100 may include reservation requests for one or more timeslots associated with the schedule.

The database 120, which may represent any suitable number of databases, may store any suitable information pertaining to the users associated with the scheduling system 100, the resources associated with the scheduling system 100, the tasks associated with the scheduling system 100, and the timeslots allocated for completing the tasks. For example, the information may include a list of users, a list of resources, a list of tasks to be completed, a list of completed tasks, performance indicators associated with the completed tasks, proficiency scores assigned to the resources, a list of proficiency classes, an indication of the resources assigned to each proficiency class, a list of timeslots, an indication of the timeslots accessible to each proficiency class, and an availability of each timeslot. In some implementations, the database 120 may be a relational database capable of presenting the data sets to a user in tabular form and capable of manipulating the data sets using relational operators. In some aspects, the database 120 may use Structured Query Language (SQL) for querying and maintaining the database.

The data processors 130, which may be used for general data processing operations (such as manipulating the datasets stored in the database 120), may be one or more suitable processors capable of executing scripts or instructions of one or more software programs stored in the recommendation system 100 (such as within the memory 135). The data processors 130 may be implemented with a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The capacity planning engine 140 may be used for generating a task schedule that includes one or more timeslots allocated for completing tasks. For example, the task schedule may be accessible (or viewable) by the resources associated with the scheduling system 100. Each timeslot represents a respective period of time (such as a duration of one or more hours) during which the resources may perform work on one or more tasks. In some implementations, each timeslot can be reserved or otherwise claimed by one or more resources associated with the scheduling system 100. For example, a resource that reserves a timeslot from 9:00 AM to 10:00 AM on a given calendar day may be allowed to access one or more tasks during that block of time. As such, the resource may perform work on the one or more tasks (such as preparing or filing one or more tax documents) inside the allotted time window and may be prevented from accessing the tasks outside of the allotted time window.

In some implementations, the capacity planning engine 140 may determine a number of timeslots to be provided in the task schedule based on demand for the tasks. In some aspects, the capacity planning engine 140 may determine the number of timeslots based on actual demand. For example, in response to receiving a large number of requests for tasks to be completed, the capacity planning engine 140 may allocate a large number of timeslots for completing the requested tasks. Similarly, the capacity planning engine 140 may allocate fewer timeslots when fewer requests are received. In some other aspects, the capacity planning engine 140 may determine the number of timeslots based on an estimated or projected demand. For example, the capacity planning engine 140 may predict the number of requests it expects to receive at a future time based, at least in part, on historical demand for the tasks.

Aspects of the present disclosure recognize that the demand may vary or fluctuate over time. For example, demand for tax filing services may increase over the days and weeks leading up to a tax filing deadline and sharply decrease immediately thereafter. Thus, in some implementations, the capacity planning engine 140 may dynamically update the number of timeslots based at least in part on changes to the actual or projected demand. To ensure that there are enough resources available to meet the demand at any given time, the capacity planning engine 140 may limit the number of times each timeslot can be reserved. For example, a given timeslot may be removed from the schedule (or otherwise indicated to be unavailable) once the timeslot has been reserved by a threshold number (N) of resources (where N represents a capacity of a given timeslot). In some implementations, the capacity planning engine 140 may determine the capacity of each timeslot based on the actual or projected demand.

Aspects of the present disclosure further recognize that the supply of resources also may vary or fluctuate over time.

For example, a tax filing service may onboard additional tax preparers over the days and weeks leading up to a tax filing deadline. Thus, in some implementations, the capacity planning engine 140 may dynamically update the number of timeslots that can be reserved by the resources, or the capacity of each timeslot, based at least in part on changes to the supply of resources. For example, as the number of resources increases, the capacity planning engine 140 also may increase the number of timeslots, or the capacity of each timeslot, associated with the task schedule. In some aspects, the capacity planning engine 140 may determine the number of timeslots, or the capacity of each timeslot, based on the actual supply of resources. In some other aspects, the capacity planning engine 140 may determine the number of timeslots, or the capacity of each timeslot, based on an estimated or projected supply of resources.

The performance monitoring engine 150 may be used for determining one or more performance indicators associated with each of the resources. For example, the performance indicators for a given resource may indicate how proficient the resource is at completing the associated tasks. Example performance indicators may include, but are not limited to, an amount of time required to complete each task (which may be averaged over a given duration), a quality of each completed task (which may be an objective indicator based on a number of errors detected in the completed task or work product), and feedback received for each completed task (which may be a subjective indicator based on a satisfaction level of the user that requested the task). In some implementations, the performance monitoring engine 150 may dynamically monitor and update the performance indicators associated with each of the resources in real-time (such as upon the completion of each task).

The dynamic scheduling engine 160 may be used for configuring access to the timeslots associated with task schedule. As described above, existing scheduling systems provide each resource an equal opportunity to access (and reserve) a given timeslot. However, aspects of the present disclosure recognize that some resources may be more proficient at completing tasks than others. Moreover, the number of available timeslots is limited and generally decreases over time (as they become reserved). Thus, in some implementations, the dynamic scheduling engine 160 may prioritize access to the timeslots based on the performance indicators associated with each resource. For example, better-performing resources (such as those that are more proficient at completing tasks) may be provided earlier access to a given set of timeslots than poorer-performing resources (such as those that are less proficient at completing tasks). As a result, the better-performing resources may have access to a wider range of available timeslots than the poorer-performing resources.

In some implementations, the dynamic scheduling engine 160 may assign a proficiency score to each of the resources based on the performance indicators associated with the resource. In some aspects, resources that require less time to complete each task may be assigned higher proficiency scores than resources that require more time to complete each task. In some other aspects, resources that produce higher quality tasks may be assigned higher proficiency scores than resources that produce lower quality tasks. Still further, in some aspects, resources that receive more positive feedback may be assigned higher proficiency scores than resources that receive more negative feedback. In some implementations, the performance monitoring engine 150 may assign different weights to different performance indicators in determining the overall proficiency score for a given resource. For example, in some aspects, the amount of time required to complete each task may contribute more heavily to the proficiency score for a given resource than the quality or feedback associated with the completed tasks.

In some implementations, the dynamic scheduling engine 160 may assign each resource to a proficiency class based on its proficiency score. Each proficiency class may be associated with a respective range of proficiency scores. In some aspects, the ranges may be fixed or predefined. For example, resources that score above an upper threshold proficiency score may be assigned to the highest proficiency class whereas resources that score below a lower threshold proficiency score may be assigned to the lowest proficiency class. As such, different proficiency classes may include different numbers of resources. In some other aspects, the ranges may be normalized based on the distribution of proficiency scores. For example, resources that score in the highest $n^{th}$ percentile (quartile, quintile, or the like) of proficiency scores may be assigned to the highest proficiency class whereas resources that score in the lowest $n^{th}$ percentile of proficiency scores may be assigned to the lowest proficiency class. As such, each proficiency class includes approximately the same number of resources.

In some implementations, the dynamic scheduling engine 160 may iteratively allow the resources to access a given set of timeslots by order of proficiency class. In other words, resources assigned to different proficiency classes may be allowed to access the set of timeslots at different times, such that resources assigned to higher proficiency classes have earlier access than resources assigned to lower proficiency classes. For example, resources assigned to the highest proficiency class may be the first to receive access to the set of timeslots whereas resources assigned to the lowest proficiency class may be the last to receive access to the set of timeslots. Thus, when the resources in the highest proficiency class are initially given access to the set of timeslots, no resources belonging to any of the other proficiency classes may access the timeslots. However, by the time the resources in the lowest proficiency class are given access to the set of timeslots, all of the resources in the higher proficiency classes will also have access to the timeslots.

Aspects of the present disclosure recognize that the performance indicators associated with each resource may change over time. For example, the performance indicators associated with resources in a lower proficiency class may improve as the resources become more proficient at completing tasks. Similarly, the performance indicators associated with resources in a higher proficiency class may degrade as the resources become overloaded or overburdened with tasks. Thus, in some implementations, the dynamic scheduling engine 160 may dynamically update the proficiency classes to reflect changes to the performance indicators. For example, in some aspects, the dynamic scheduling engine 160 may update the proficiency scores daily. As such, each proficiency score may reflect the performance indicators for a given resource averaged over a single day. In some other aspects, the dynamic scheduling engine 160 may update the proficiency scores weekly. As such, each proficiency score may reflect the performance indicators for a given resource averaged over a week.

With each update to the proficiency scores, the proficiency classes also may be updated to reflect the current proficiency level of each resource. As a result, resources that become more proficient at completing tasks can move up in proficiency classes-, and thus have access to a wider range of available timeslots (such as by gaining access to timeslots further into the future). On the other hand, resources that become less proficient at completing tasks can move down in proficiency classes, and thus have access to a narrower range of available timeslots (such as by losing access to timeslots further into the future). By dynamically updating the proficiency classes, the dynamic scheduling engine 160 may ensure that resources are allocated in the most productive (or optimal) manner at any given time.

The particular architecture of the scheduling system 100 shown in FIG. 1 is but one example of a variety of different architectures within which aspects of the present disclosure may be implemented. For example, in some other implementations, the capacity planning engine 140 may be replaced by timeslot information stored as data in the database 120. In some other implementations, the scheduling system 100 may not include a performance monitoring engine 150, the functions of which may be implemented by the processors 130 executing corresponding instructions or scripts stored in the memory 135. Still further, in some implementations, the functions of the dynamic scheduling engine 160 may be performed by the processors 130 executing corresponding instructions or scripts stored in the memory 135.

Figure 2:
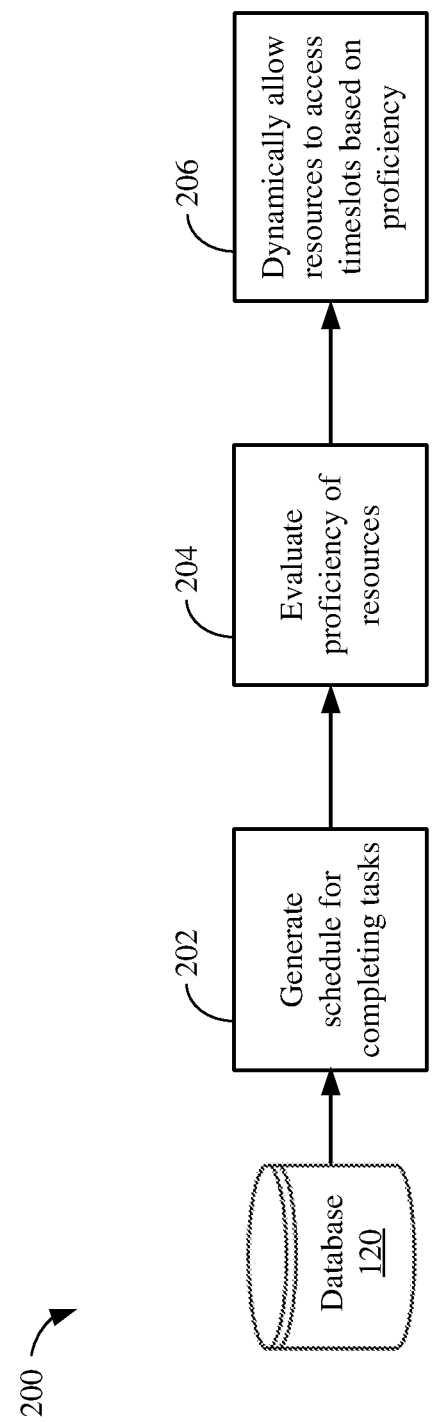
FIG. 2 shows an example process flow that may be employed by the scheduling system of FIG. 1, according to some implementations.

FIG. 2 shows a high-level overview of an example process flow 200 that may be employed by the scheduling system 100 of FIG. 1. More specifically, the process flow 200 depicts an example operation for scheduling resources of the scheduling system 100 to complete tasks requested by users of the scheduling system 100.

At block 202, a schedule is generated for completing the tasks. The task schedule may include one or more timeslots that can be reserved by one or more of the resources. In some implementations, the capacity planning engine 140 may determine the number of timeslots to be provided in the task schedule based on actual or projected demand for the tasks, the actual or projected supply of resources, or a combination thereof. In some other implementations, the capacity planning engine 140 may determine the capacity of each timeslot (representing the number of different resources that can reserve a given timeslot) based on the actual or projected demand, the actual or projected supply of resources, or a combination thereof. In some implementations, at least some of the timeslots may be accessible to each of the resources associated with the scheduling system 100, concurrently, during an "initial evaluation period." In other words, any of the resources can immediately access (and reserve) timeslots associated with the initial evaluation period.

Figure 3:
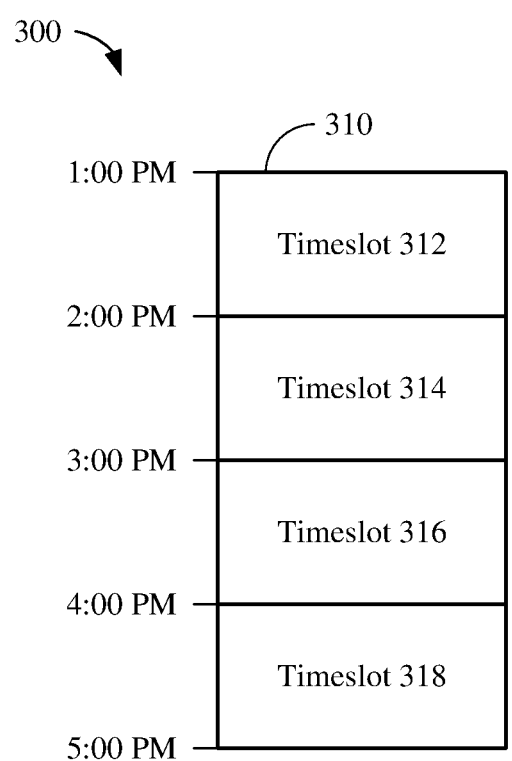
FIG. 3 shows an example task schedule according to some implementations.

FIG. 3 shows an example task schedule 300 according to some implementations. The task schedule 300 includes a set of timeslots 310 that can be reserved by the resources associated with the scheduling system 100 of FIG. 1. In the example of FIG. 3, the set of timeslots 310 may be associated with a single calendar day. The set 310 includes timeslots 312-318, each spanning a respective 1-hour period of the calendar day. More specifically, timeslot 312 represents a 1-hour interval from 1:00 PM to 2:00 PM, timeslot 314 represents a 1-hour interval from 2:00 PM to 3:00 PM, timeslot 316 represents a 1-hour interval from 3:00 PM to 4:00 PM, and timeslot 318 represents a 1-hour interval from 4:00 PM to 5:00 PM. Although four timeslots 312-318 are depicted in FIG. 3, actual implementations of the task schedule 300 may include fewer or more timeslots than those shown. For example, the task schedule 300 may include additional timeslots spanning days, weeks, or months (not shown for simplicity). In some implementations, each of the timeslots 312-318 can be reserved a threshold number (N) of times. For example, a given timeslot may be removed from the task schedule 300 (or otherwise indicated to be unavailable) after being reserved by N different resources.

At block 204 of FIG. 2, each resource is evaluated for its proficiency at completing one or more tasks. As described above, the proficiency of a given resource may be represented by one or more performance indicators. Example performance indicators may include, but are not limited to, an amount of time required to complete each task, a quality of each completed task, and feedback received for each completed task. In some implementations, the proficiency of the resources may be evaluated over an evaluation period (such as the initial evaluation period). For example, the performance monitoring engine 150 may dynamically monitor and update the performance indicators associated with each of the resources upon the completion of each task. At the end of the evaluation period, the dynamic scheduling engine 160 may assign a proficiency score to each of the resources based on the performance indicators associated with the resource (averaged over the evaluation period). In some implementations, the performance monitoring engine 150 may assign different weights to different performance indicators in determining the proficiency score for a given resource.

FIG. 4 shows a table 400 depicting an example scoring of resources according to some implementations. More specifically, the table 400 shows a list of resource identifiers (ID) 410 for a number (M) of resources (in the left column) and a list of proficiency scores 420 associated therewith (in the right column). For example, resource 1 is assigned a proficiency score of 90, resource 2 is assigned a proficiency score of 80, resource 3 is assigned a proficiency score of 70, resource 4 is assigned a proficiency score of 60, resource 5 is assigned a proficiency score of 40, resource 6 is assigned a proficiency score of 30, resource 7 is assigned a proficiency score of 20, and resource M is assigned a proficiency score of 10. In the example of FIG. 4, the proficiency scores 420 can range from 1 to 100, where resources that are assigned higher proficiency scores are determined to be more proficient at completing tasks than resources that are assigned lower proficiency scores. However, in actual implementations, the proficiency scores 420 can include any range of values.

At block 206 of FIG. 2, the resources are dynamically provided access to additional timeslots associated with the task schedule based on the proficiency scores. For example, resources with higher proficiency scores may be allowed to access a given set of timeslots earlier than resources with lower proficiency scores. In some implementations, the dynamic scheduling engine 160 may assign each resource to a particular proficiency class based on its proficiency score. In some aspects, each proficiency class may represent a fixed or predefined range of proficiency scores. In some other aspects, each proficiency class may represent a range of proficiency scores that is normalized based on the distribution of scores. Resources that are associated with higher proficiency classes may receive access to a given set of timeslots earlier than resources that are associated with lower proficiency classes. More specifically, resources associated with higher proficiency classes may view and reserve timeslots further into the future than resources associated with lower proficiency classes.

Figure 5:
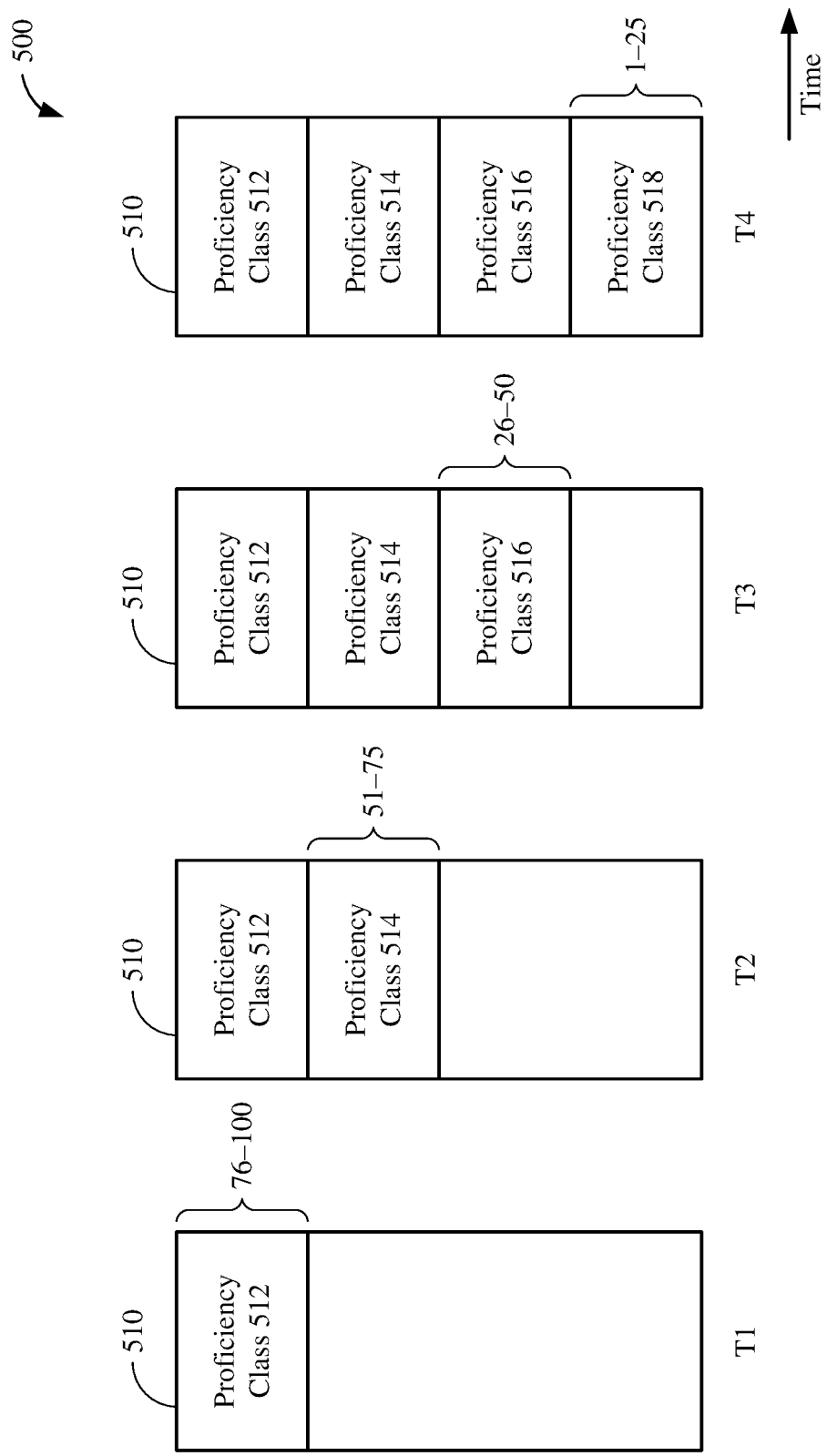
FIG. 5 shows a timing diagram depicting an example operation for dynamically updating a group of resources having access to a particular set of timeslots, according to some implementations.

FIG. 5 shows a timing diagram 500 depicting an example operation for dynamically updating a group of resources 510 having access to a particular set of timeslots, according to some implementations. With reference for example to FIG. 3, resources belonging to the group 510 may have access to the set of timeslots 310. At time T1, resources associated with a first proficiency class 512, encompassing the range of proficiency scores 76-100, are added to the group 510. With reference for example to FIG. 4, resources 1 and 2 may access the set of timeslots 310 at time T1. At time T2, resources associated with a second proficiency class 514, encompassing the range of proficiency scores 51-75, are added to the group 510. With reference for example to FIG. 4, resources 3 and 4 may access the set of timeslots 310 at time T2. At time T3, resources associated with a third proficiency class 516, encompassing the range of proficiency scores 26-50, are added to the group 510. With reference for example to FIG. 4, resources 5 and 6 may access the set of timeslots 310 at time T3. At time T4, resources associated with a fourth proficiency class 518, encompassing the range of proficiency scores 1-25, are added to the group 510. With reference for example to FIG. 4, resources 7 and M may access the set of timeslots 310 at time T4.

As shown in FIG. 5, the resources associated with the first proficiency class 512 have exclusive access to the set of timeslots 310 at time T1. In other words, at time T1, the resources belonging to the first proficiency class 512 may not compete with any resources belonging to the remaining proficiency classes 514-518 for access to the timeslots 310. At time T2, the resources belonging to the second proficiency class 514 may compete with the resources belonging to the first proficiency class 512 for access to the timeslots 310. At time T3, the resources belonging to the third proficiency class 516 may compete with the resources belonging to the proficiency classes 512 and 514 for access to the timeslots 310. At time T4, and beyond, the resources associated with the fourth proficiency class 518 may compete with the resources belonging to the proficiency classes 512-516 for access to the timeslots 310. Because timeslots have a limited capacity (and become unavailable once they have been reserved a threshold number of times), resources associated with higher proficiency classes may have access to a wider range of available timeslots than resources associated with the lower proficiency classes.

Figure 6:
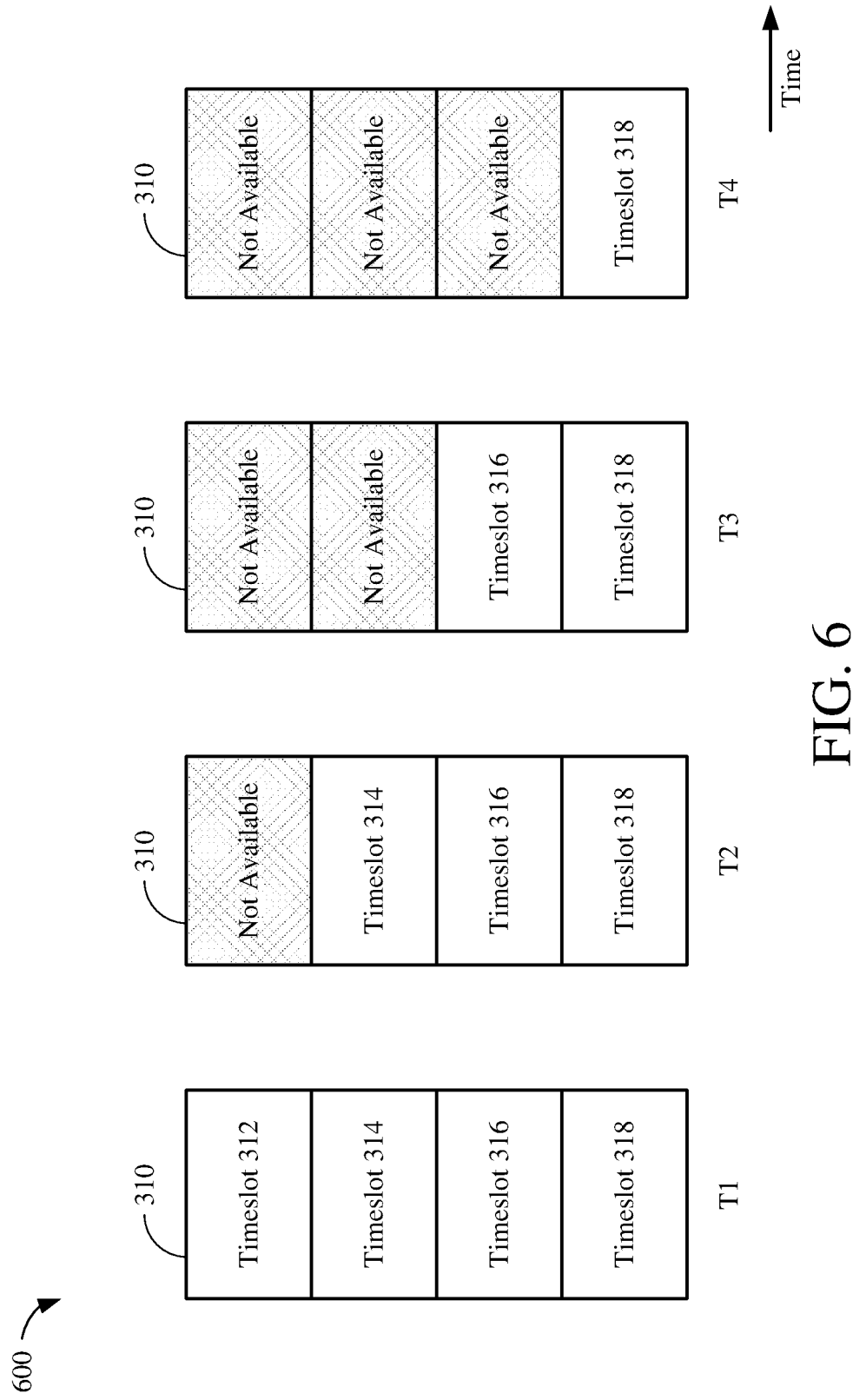
FIG. 6 shows a timing diagram depicting example changes to the set of timeslots depicted in FIG. 3, according to some implementations.

FIG. 6 shows a timing diagram 600 depicting example changes to the set of timeslots 310 depicted in FIG. 3, according to some implementations. More specifically, the timing diagram 600 shows a state of the timeslots 310 at discrete times T1-T4, which may coincide with times T1-T4, respectively, of FIG. 5. At time T1, when the first proficiency class 512 is added to the group 510, each of the timeslots 312-318 in the set of timeslots 310 is available to be reserved. At time T2, when the second proficiency class 514 is added to the group 510, only timeslots 314-318 are available to be reserved (timeslot 312 has reached capacity). At time T3, when the third proficiency class 516 is added to the group 510, only timeslots 316 and 318 are available to be reserved (timeslots 312 and 314 have reached capacity). At time T4, when the fourth proficiency class 518 is added to the group 510, only timeslot 318 is available to be reserved (timeslots 312-316 have reached capacity).

The examples described above, with reference FIGS. 3-6, illustrate a process for dynamically providing access to a set of timeslots 310 associated with a single calendar day of the task schedule 300. However, in actual implementations, the task schedule 300 may include multiple sets of timeslots spanning days, weeks, or months. In some implementations, the proficiency class associated with a given resource may determine how far into the future the resource can view and reserve timeslots associated with the task schedule. For example, resources associated with the first proficiency class 512 may access timeslots scheduled to occur up to a number (n) of days in the future, resources associated with the second proficiency class 514 may only access timeslots scheduled to occur up to n−1 days in the future, resources associated with the third proficiency class 516 may only access timeslots scheduled to occur up to n−2 days in the future, and resources associated with the fourth proficiency class 518 may only access timeslots scheduled to occur up to n−3 days in the future.

Figure 7A:
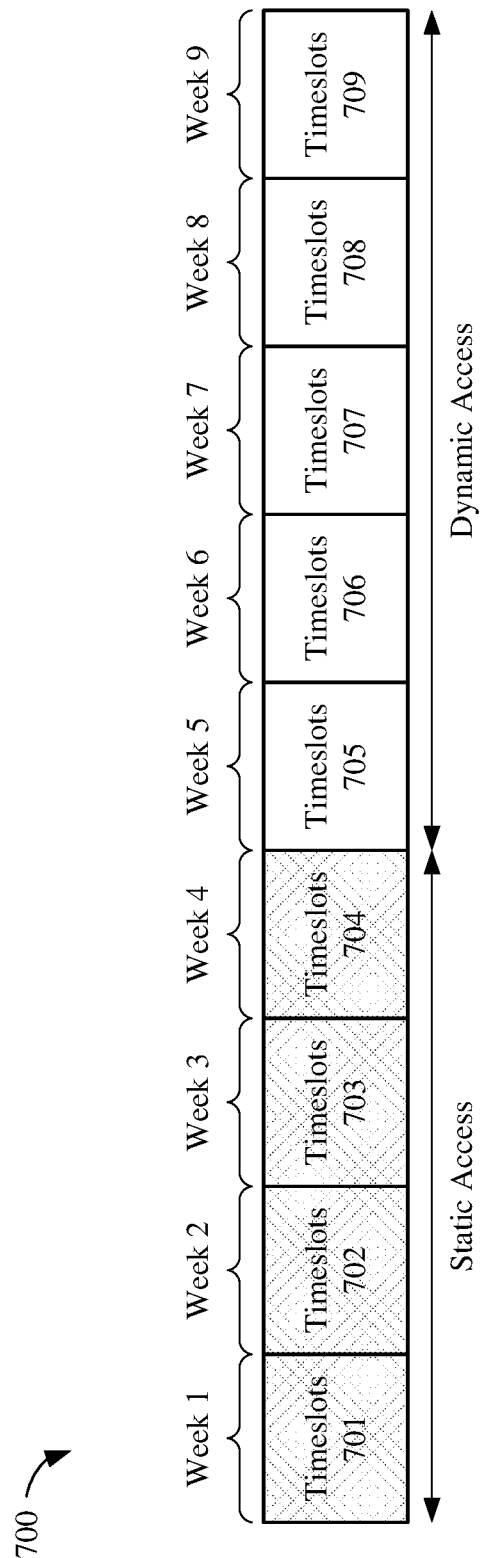
FIG. 7A shows another example task schedule, according to some implementations.

FIG. 7A shows another example task schedule 700, according to some implementations. The task schedule 700 includes multiple sets of timeslots 701-709 that can be reserved by the resources associated with the scheduling system 100 of FIG. 1. In the example of FIG. 7A, the timeslots 701-709 may be associated with respective calendar weeks 1-9. Although not shown, for simplicity, each set of timeslots 701-709 may include one or more timeslots each spanning a respective duration of a given calendar day (such as described with reference to FIG. 3). In some implementations, access to the first four sets of timeslots 701-704 may be provided statically, whereas access to the remaining sets of timeslots 705-709 may be provided dynamically. In other words, all resources associated with the scheduling system 100 may be provided access to the first four sets of timeslots 701-704 at substantially the same time (such as four weeks prior to the start of week 1). Thus, any of the resources may reserve any of the available timeslots in the first four sets 701-704 and perform work on user-requested tasks during the reserved timeslots.

In some implementations, the performance monitoring engine 150 may dynamically monitor and update one or more performance indicators associated with each of the resources. Example performance indicators may include, but are not limited to, an amount of time required to complete each task, a quality of each completed task, and feedback received for each completed task. In some implementations, the dynamic scheduling engine 160 may assign a proficiency score to each of the resources based on the performance indicators associated with the resource during a given evaluation period (such as described with reference to FIG. 4). In the example of FIG. 7A, each evaluation period spans a duration equal to 1 week. For example, at the end of week 1 (or the initial evaluation period), the dynamic scheduling engine 160 may determine a respective proficiency score for each of the resources based on the performance indicators averaged over week 1. Then, at the end of week 2, the dynamic scheduling engine 160 may determine a new proficiency score for each of the resources based on the performance indicators averaged over week 2.

In some implementations, the dynamic scheduling engine 160 may further assign each resource to a proficiency class based on its proficiency score (such as described with reference to FIG. 5). For example, at the end of week 1, resources having the highest proficiency scores may be assigned to the highest proficiency class while resources having the lowest proficiency may be assigned to the lowest proficiency class. Then, at the end of week 2, resources having the highest proficiency scores may again be assigned to the highest proficiency class while resources having the lowest proficiency scores may again be assigned to the lowest proficiency class. As described above, the performance indicators associated with each resource may change over time. As a result, the proficiency class to which a given resource is assigned also may change over time. For example, some resources that are assigned to the highest proficiency class at the end of week 1 may not be assigned to the highest proficiency class at the end of week 2.

Similarly, some resources that are assigned to the lowest proficiency class at the end of week 1 may not be assigned to the lowest proficiency class at the end of week 2.

In some implementations, the dynamic scheduling engine 160 may dynamically provide access to the timeslots 705-709 based on the proficiency class associated with each resource (such as described with reference to FIG. 5). More specifically, resources that are assigned to a higher proficiency class may be given earlier access to a given set of timeslots (or access to timeslots that occur further in the future) than resources that are assigned to a lower proficiency class. In the example of FIG. 7A, the resources may be assigned to one of four proficiency classes A-D. More specifically, resources belonging to the highest proficiency class (A) may be allowed to access timeslots 4 weeks in advance, resources belonging to the second-highest proficiency class (B) may be allowed to access timeslots 3 weeks in advance, resources belonging to the second-lowest proficiency class (C) may be allowed to access timeslots 2 weeks in advance, and resources belonging to the lowest proficiency class (D) may only be allowed to access timeslots for the next week.

FIG. 7B shows an example timetable 710 by which resources may dynamically access the task schedule of FIG. 7A, according to some implementations. At the end of week 1, resources assigned to proficiency class A gain access to timeslots 705 (in addition to having access to timeslots 702-704), whereas resources assigned to proficiency classes B-D may only access timeslots 702-704. At the end of week 2, resources assigned to proficiency class A gain access to timeslots 706 (in addition to having access to timeslots 703-705), resources assigned to proficiency class B gain access to timeslots 705 (in addition to having access to timeslots 703 and 704), whereas resources assigned to proficiency classes C and D may only access timeslots 703 and 704. At the end of week 3, resources assigned to proficiency class A gain access to timeslots 707 (in addition to having access to timeslots 704-706), resources assigned to proficiency class B gain access to timeslots 706 (in addition to having access to timeslots 704 and 705), resources assigned to proficiency class C gain access to timeslots 705 (in addition to having access to timeslots 704), whereas resources assigned to proficiency class D may only access timeslots 704.

The dynamic scheduling described with reference to FIG. 7B may continue in perpetuity, until there are no more available timeslots remaining in the task schedule, or until all user-requested tasks have been completed. For example, at the end of week 4, resources assigned to proficiency class A may gain access to timeslots 708, resources assigned to proficiency class B may gain access to timeslots 707, resources assigned to proficiency class C may gain access to timeslots 706, and resources assigned to proficiency class D may gain access to timeslots 705. At the end of week 5, resources assigned to proficiency class A may gain access to timeslots 709, resources assigned to proficiency class B may gain access to timeslots 708, resources assigned to proficiency class C may gain access to timeslots 707, and resources assigned to proficiency class D may gain access to timeslots 706. In this manner, the resources assigned to a higher proficiency class receive access to a new set of timeslots one week before the resources assigned to the proficiency class immediately below.

Figure 8:
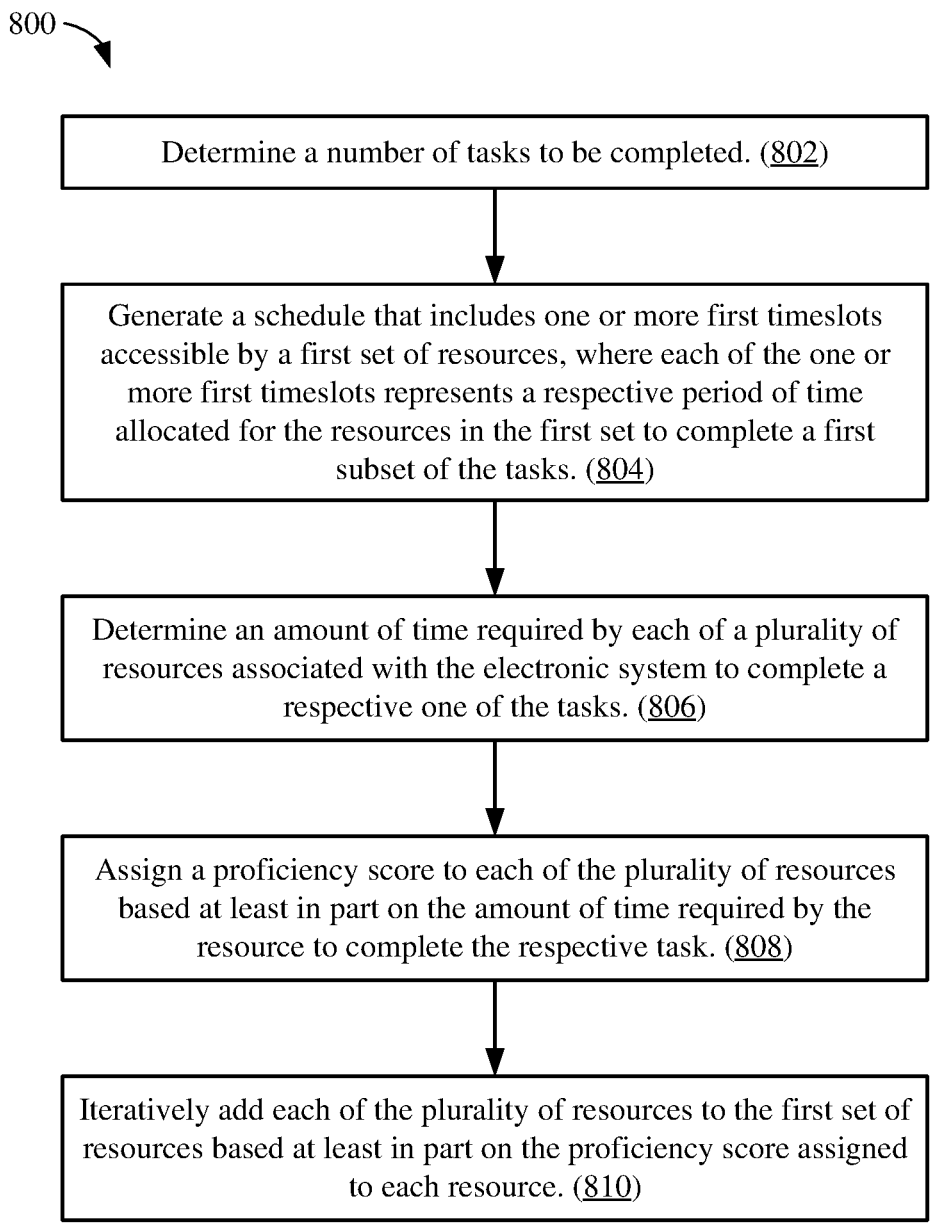
FIG. 8 shows an illustrative flow chart depicting an example operation for scheduling tasks, according to some implementations.

FIG. 8 shows an illustrative flow chart depicting an example operation 800 for scheduling tasks, according to some implementations. The example operation 800 may be performed by one or more processors of a scheduling system. In some implementations, the example operation 800 may be performed using the scheduling system 100 of FIG. 1. However, it is to be understood that the example operation 800 may be performed by other suitable systems, computers, or servers.

At block 802, the scheduling system 100 determines a number of tasks to be completed. At block 804, the scheduling system 100 generates a schedule that includes one or more first timeslots accessible by a first set of resources, where each of the one or more first timeslots represents a respective period of time allocated for the resources in the first set to complete a first subset of the tasks. At block 806, the scheduling system 100 determines an amount of time required by each of a plurality of resources associated with the electronic system to complete a respective one of the tasks. At block 808, the scheduling system 100 assigns a proficiency score to each of the plurality of resources based at least in part on the amount of time required by the resource to complete the respective task. At block 810, the scheduling system 100 iteratively adds each of the plurality of resources to the first set of resources based at least in part on the proficiency score assigned to each resource.

In some implementations, the assigning of the proficiency score may include assigning a first proficiency score to one or more first resources of the plurality of resources and assigning a second proficiency score to one or more second resources of the plurality of resources, where the first proficiency score is higher than the second proficiency score. For example, the one or more first resources may require less time than the one or more second resources to complete the respective tasks. In some implementations, the iterative adding of each of the plurality of resources to the first set of resources may include adding the one or more first resources to the first set of resources at a first time and adding the one or more second resources to the first set of resources at a second time occurring later than the first time. In some aspects, the one or more first timeslots may be associated with a first calendar day, where the first time occurs a first number (n) of days prior to the first calendar day and the second time occurs a second (m) number of days prior to the first calendar day, where n>m.

In some implementations, the scheduling system 100 may further receive, from the first set of resources, a number of reservations associated with a selected timeslot of the one or more first timeslots; determine whether the number of reservations is equal to a threshold number of reservations allocated for the selected timeslot; and dynamically remove the selected timeslot form the schedule responsive to determining that the number of reservations is equal to the threshold number. In some aspects, the selected timeslot may be removed prior to adding at least one of the resources of the plurality of resources to the first set.

In some implementations, the assigning of the proficiency score may include determining a quality metric for each of the completed tasks, where the proficiency score is assigned to each of the plurality of resources based at least in part on the quality metric of the respective task completed by the resource. In some other implementations, the assigning of the proficiency score may include receiving feedback for each of the completed tasks, where the proficiency score is assigned to each of the plurality of resources based at least in part on the feedback received for the respective task completed by the resource.

In some implementations, the scheduling system 100 may further update the schedule to include one or more second timeslots accessible by a second set of resources, where each of the one or more second timeslots represents a respective period of time allocated for the resources in the second set to complete a second subset of the tasks; determine an amount of time required by each of the plurality of resources to complete a respective one of the tasks in the first subset; assign a second proficiency score to each of the plurality of resources based at least in part on the amount of time required by the resource to complete the respective task in the first subset; and iteratively add each of the plurality of resources to the second set of resources based at least in part on the proficiency score assigned to each resource.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of scheduling tasks in an electronic system, the method performed by one or more processors and comprising:

determining a number of tasks to be completed;

generating a schedule that includes one or more first timeslots, each of the one or more first timeslots representing a respective period of time allocated for resources to complete a first subset of the tasks;

determining an amount of time required by each of a plurality of resources associated with the electronic system to complete a respective one of the tasks;

assigning a proficiency score to each of the plurality of resources based at least in part on the amount of time required by the resource to complete the respective task;

controlling an interface with the electronic system to selectively provide electronic access to the schedule through the interface to resources based on assigned proficiency scores, wherein controlling the interface with the electronic system comprises enabling a first set of resources that are assigned higher proficiency scores to view the schedule and to reserve one or more timeslots through the interface and preventing resources assigned lower proficiency scores from viewing the schedule or reserving the one or more timeslots through the interface; and dynamically updating the proficiency score assigned to each of the plurality of resources, wherein controlling the interface with the electronic system to selectively provide electronic access to the schedule through the interface to resources is further based on updated proficiency scores.

2. The method of claim 1, wherein the assigning of the proficiency score comprises:

assigning a first proficiency score to one or more first resources of the plurality of resources; and assigning a second proficiency score to one or more second resources of the plurality of resources, the first proficiency score being higher than the second proficiency score.

3. The method of claim 2, wherein the one or more first resources require less time than the one or more second resources to complete the respective tasks.

4. The method of claim 1, wherein controlling the interface with the electronic system to selective provide electronic access to the schedule through the interface to resources further comprises:
enabling the first set of resources that are assigned the higher proficiency scores to view the schedule and to reserve the one or more timeslots through the interface at a first time; and
enabling a second set of resources that are assigned the lower proficiency scores to view the schedule and to reserve the one or more timeslots through the interface at a second time occurring later than the first time.

5. The method of claim 4, wherein the one or more first timeslots are associated with a first calendar day, the first time occurring a first number (n) of days prior to the first calendar day and the second time occurring a second number (m) of days prior to the first calendar day, where n>m.

6. The method of claim 1, further comprising:
receiving, from the first set of resources through the interface with the electronic system, a number of reservations associated with a selected timeslot of the one or more first timeslots;
determining whether the number of reservations is equal to a threshold number of reservations allocated for the selected timeslot;
dynamically updating the schedule by removing the selected timeslot from the schedule responsive to determining that the number of reservations is equal to the threshold number; and
controlling the interface with the electronic system to provide the first set of resources with an updated schedule with the selected timeslot removed.

7. The method of claim 6, wherein the selected timeslot is removed prior to adding at least one of the resources of the plurality of resources to the first set.

8. The method of claim 1, wherein the assigning of the proficiency score comprises:
determining a quality metric for each task completed by each resource, the proficiency score being assigned to each of the plurality of resources based at least in part on the quality metric for each task completed by the respective resource.

9. The method of claim 1, wherein the assigning of the proficiency score comprises:
receiving feedback for each task completed by each resource, the proficiency score being assigned to each of the plurality of resources based at least in part on the feedback received for each task completed by the respective resource.

10. The method of claim 1, further comprising:
updating the schedule to include one or more second timeslots, each of the one or more second timeslots representing a respective period of time allocated for the resources to complete a second subset of the tasks;
determining an amount of time required by each of the plurality of resources to complete a respective one of the tasks in the second subset;
assigning a second proficiency score to each of the plurality of resources based at least in part on the amount of time required by the resource to complete the respective task in the second subset; and
controlling the interface with the electronic system to selectively provide electronic access to the schedule through the interface with the electronic system to resources based on assigned second proficiency scores by enabling a second set of resources that are assigned higher second proficiency scores to view the schedule and to reserve the one or more second timeslots through the interface and preventing resources assigned lower second proficiency scores from viewing the schedule or reserving the one or more second timeslots through the interface.

11. A scheduling system, comprising:
an interface through which resources access the scheduling system;
one or more processors; and
a memory storing instructions that, when executed by the one or more processors, causes the scheduling system to perform operations including:
determining a number of tasks to be completed;
generating a schedule that includes one or more first timeslots, each of the one or more first timeslots representing a respective period of time allocated for resources to complete a first subset of the tasks;
determining an amount of time required by each of a plurality of resources associated with the scheduling system to complete a respective one of the tasks;
assigning a proficiency score to each of the plurality of resources based at least in part on the amount of time required by the resource to complete the respective task;
controlling the interface to selectively provide electronic access to the schedule through the interface to resources based on assigned proficiency scores, wherein controlling the interface comprises enabling a first set of resources that are assigned higher proficiency scores to view the schedule and to reserve one or more timeslots through the interface and preventing resources assigned lower proficiency scores from viewing the schedule or reserving the one or more timeslots through the interface; and
dynamically updating the proficiency score assigned to each of the plurality of resources, wherein controlling the interface to selective provide electronic access to the schedule through the interface to resources is further based on updated proficiency scores.

12. The scheduling system of claim 11, wherein execution of the instructions for assigning the proficiency score causes the scheduling system to perform operations further comprising:
assigning a first proficiency score to one or more first resources of the plurality of resources; and
assigning a second proficiency score to one or more second resources of the plurality of resources, the first proficiency score being higher than the second proficiency score.

13. The scheduling system of claim 12, wherein the one or more first resources require less time than the one or more second resources to complete the respective tasks.

14. The scheduling system of claim 11, wherein execution of the instructions for controlling the interface to selectively provide access to the schedule through the interface to resources further comprises:
enabling the first set of resources that are assigned the higher proficiency scores to view the schedule and to reserve the one or more timeslots through the interface at a first time; and
enabling a second set of resources that are assigned the lower proficiency scores to view the schedule and to reserve the one or more timeslots through the interface at a second time occurring later than the first time.

15. The scheduling system of claim 14, wherein the one or more first timeslots are associated with a first calendar day, the first time occurring a first number (n) of days prior to the first calendar day and the second time occurring a second number (m) of days prior to the first calendar day, where n>m.

16. The scheduling system of claim 11, wherein execution of the instructions further causes the scheduling system to perform operations comprising:
receiving, from the first set of resources through the interface, a number of reservations associated with a selected timeslot of the one or more first timeslots;
determining whether the number of reservations is equal to a threshold number of reservations allocated for the selected timeslot;
dynamically updating the schedule by removing the selected timeslot from the schedule responsive to determining that the number of reservations is equal to the threshold number; and
controlling the interface to provide is with an updated schedule with the selected timeslot removed.

17. The scheduling system of claim 11, wherein execution of the instructions for assigning the proficiency score causes the scheduling system to perform operations further comprising:
determining a quality metric for each task completed by each resource, the proficiency score being assigned to each of the plurality of resources based at least in part on the quality metric for each completed by the respective resource.

18. The scheduling system of claim 11, wherein execution of the instructions for assigning the proficiency score causes the scheduling system to perform operations further comprising:
receiving feedback for each task completed by each resource, the proficiency score being assigned to each of the plurality of resources based at least in part on the feedback received for each completed by the respective resource.

19. The scheduling system of claim 11, wherein execution of the instructions further causes the scheduling system to perform operations comprising:
updating the schedule to include one or more second timeslots, each of the one or more second timeslots representing a respective period of time allocated for the resources to complete a second subset of the tasks;
determining an amount of time required by each of the plurality of resources to complete a respective one of the tasks in the second subset;
assigning a second proficiency score to each of the plurality of resources based at least in part on the amount of time required by the resource to complete the respective task in the second subset; and
controlling the interface selectively provide electronic access to the schedule through the interface to resources based on assigned second proficiency scores by enabling a second set of resources that are assigned higher second proficiency scores to view the schedule and to reserve one or more timeslots through the interface and preventing resources assigned lower second proficiency scores from viewing the schedule or reserving the one or more timeslots through the interface.

20. A method of scheduling tasks in an electronic system, the method performed by one or more processors and comprising:
determining a number of tasks to be completed;
generating a schedule that includes one or more first timeslots and one or more second timeslots, each of the one or more first timeslots representing a respective period of time allocated for resources to complete a first subset of the tasks and each of the one or more second timeslots representing a respective period of time allocated for the resources to complete a second subset of the tasks;
determining an amount of time required by each of a plurality of resources to complete a respective one of the tasks in the second subset;
assigning a proficiency score to each of the plurality of resources based at least in part on the amount of time required by the resource to complete the respective task;
controlling an interface with the electronic system to provide electronic access to the schedule for the one or more first timeslots through the interface with the electronic system to a first set of resources by enabling the first set of resources to view the schedule and to reserve the one or more first timeslots through the interface;
controlling the interface with the electronic system to selectively provide electronic access to the schedule for the one or more second timeslots through the interface with the electronic system to resources based on assigned proficiency scores by enabling a second set of resources that are assigned higher proficiency scores to view the schedule and to reserve the one or more second timeslots through the interface and preventing resources assigned lower second proficiency scores from viewing the schedule or reserving the one or more second timeslots through the interface; and
dynamically updating the proficiency score assigned to each of the plurality of resources wherein controlling the interface with the electronic system to selective provide electronic access to the schedule through the interface to resources is further based on updated proficiency scores.

* * * * *